United States Patent
Su et al.

(10) Patent No.: US 7,627,743 B2
(45) Date of Patent: Dec. 1, 2009

(54) METHOD AND CIRCUIT IMPLEMENTATION FOR MULTIPLE-WORD TRANSFER INTO/FROM MEMORY SUBSYSTEMS

(75) Inventors: Hong-Men Su, Hsinchu County (TW); Chuan-Hua Chang, Taipei (TW); Jen-Chih Tseng, Taoyuan County (TW)

(73) Assignee: Andes Technology Corporation, Hsin-Chu (TW)

( * ) Notice: Subject to any disclaimer, the term of this patent is extended or adjusted under 35 U.S.C. 154(b) by 350 days.

(21) Appl. No.: 11/622,471

(22) Filed: Jan. 12, 2007

(65) Prior Publication Data

US 2008/0172550 A1 Jul. 17, 2008

(51) Int. Cl.
*G06F 9/312* (2006.01)
*G06F 9/345* (2006.01)
(52) U.S. Cl. ..................................... 712/225
(58) Field of Classification Search .................. 712/255
See application file for complete search history.

(56) References Cited

U.S. PATENT DOCUMENTS 4,814,976 A 3/1989 Hansen et al.
5,583,804 A 12/1996 Seal et al.
7,243,213 B2 * 7/2007 Pagni et al. ................. 712/209

OTHER PUBLICATIONS

Andrew S. Tanenbaum, Structured Computer Organization, Prentice-Hall, 1984, pp. 11-12.*

* cited by examiner

*Primary Examiner*—William M Treat
(74) *Attorney, Agent, or Firm*—Jianq Chyun IP Office

(57) ABSTRACT

A multi-word transfer instruction, a memory transfer method using the multi-word transfer instruction and a circuit implementation for transferring multiple words between a memory subsystem and a processor register file are provided. The multi-word transfer instruction specifies an access type (load or store), a consecutive register group, a selection mask and a base register for the starting address of the corresponding memory locations. Therefore, the total number of words accessed by this instruction is equal to the number of registers specified in the consecutive register group along with the number of the registers specified by the selection mask. Besides, additional information, such as an address update mode, an order mode and a modification mode, may be further specified in the multi-word transfer instruction.

2 Claims, 1 Drawing Sheet

METHOD AND CIRCUIT IMPLEMENTATION FOR MULTIPLE-WORD TRANSFER INTO/FROM MEMORY SUBSYSTEMS

BACKGROUND OF THE INVENTION

1. Field of Invention

The present invention relates to a method and a circuit implementation for multiple-word transfer between a processor register file and a memory subsystem.

2. Description of Related Art

Common compiling or assembly programming practice often needs to access continuous memory locations in memory subsystems, whose smallest addressable unit is one byte, in a sequence, such as function stack pushing and popping, copying of a chunk of memory from one location to another, etc. Most modern processors access one memory location by one instruction. As a result, transferring multiple words can only be achieved by a sequence of one-word transfer instructions. For example, a word load instruction can move one word, which contains 4 bytes, from a memory location to a processor register one at a time. Three of such word load instructions, which can have a format like the following, together perform 3-word transfer.

```
ld_word r1, [BASE].
ld_word r2, [BASE+4].
ld_word r14, [BASE+8].
```

In the above example, ld_word refers to a word load instruction, r1, r2 and r14 refer to the indexes of the processor registers which are to receive the values of the corresponding addressed memory locations, and BASE refers to the index of the processor register whose content is used as the base address of the memory locations. The base address is usually added with another value called offset to form the final memory address. In common programming practice, when multiple memory locations are accessed, registers involved are usually in consecutive indexes. Further, special registers, such as general data pointer (dp), frame pointer (fp), function call return pointer (rp) and stack pointer (sp) are often involved.

However, using a sequence of one-word transfer instructions to achieve multi-word transfer may lead to larger program code size and lower performance.

Some processors with a small register file can access multiple words in an instruction by specifying a selection mask for registers involved in memory accesses. One memory word access needs one register as the source (for memory store) or the destination (for memory load) of the corresponding memory access.

For example, a multi-word transfer instruction in a 16-register (which are numbered from r0~r15) processor can be specified as:

```
ld_multi_word 0b0100000000000110, [BASE].
```

In this example, 0b0100000000000110 is a full 16-bit selection mask to specify that registers r1, r2 and r14 are used in the transfer.

However, this instruction specification mechanism is impossible for processors with N registers and M-bit instruction format if N is greater than or equal to M because the register selection mask itself needs N bits and leaves no room to encode other information in the instruction format. It is inefficient for such processors if M-N is a small positive number, which indicates the bits remaining in the instruction format to encode other information. For example, the most common processors with 32-bit instruction format have 32 general-purpose processor registers, and such instruction format is impossible to incorporate full register selection mask.

Therefore, it is useful to have a mechanism for memory transfer instruction in processors with many registers for moving multiple words between consecutive memory locations and processor registers to achieve smaller program code size, improved instruction access bandwidth and higher performance.

SUMMARY OF THE INVENTION

The invention is directed to provide a multi-word transfer instruction for moving multiple words between consecutive memory locations and a processor register file.

The invention is also directed to provide a memory transfer method and a circuit implementation for the same, for moving multiple words between consecutive memory locations and a processor register file.

In the invention, the multi-word transfer instruction specifies an access type (load or store), a register group in a processor register file with consecutive indexes, a selection mask to select special registers in a processor register file and an index of a base register for a starting address of corresponding memory locations in the memory subsystem.

Further, the total number of words accessed by one multi-word transfer instruction is equal to the number of the registers specified in the consecutive register group, plus the number of the registers specified by the selection mask. Besides, additional information, such as an address update mode, an order mode and a modification mode, may be specified in the multi-word transfer instruction for different memory addressing modes.

It is to be understood that both the foregoing general description and the following detailed description are exemplary, and further explanation of the invention as claimed are to be provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
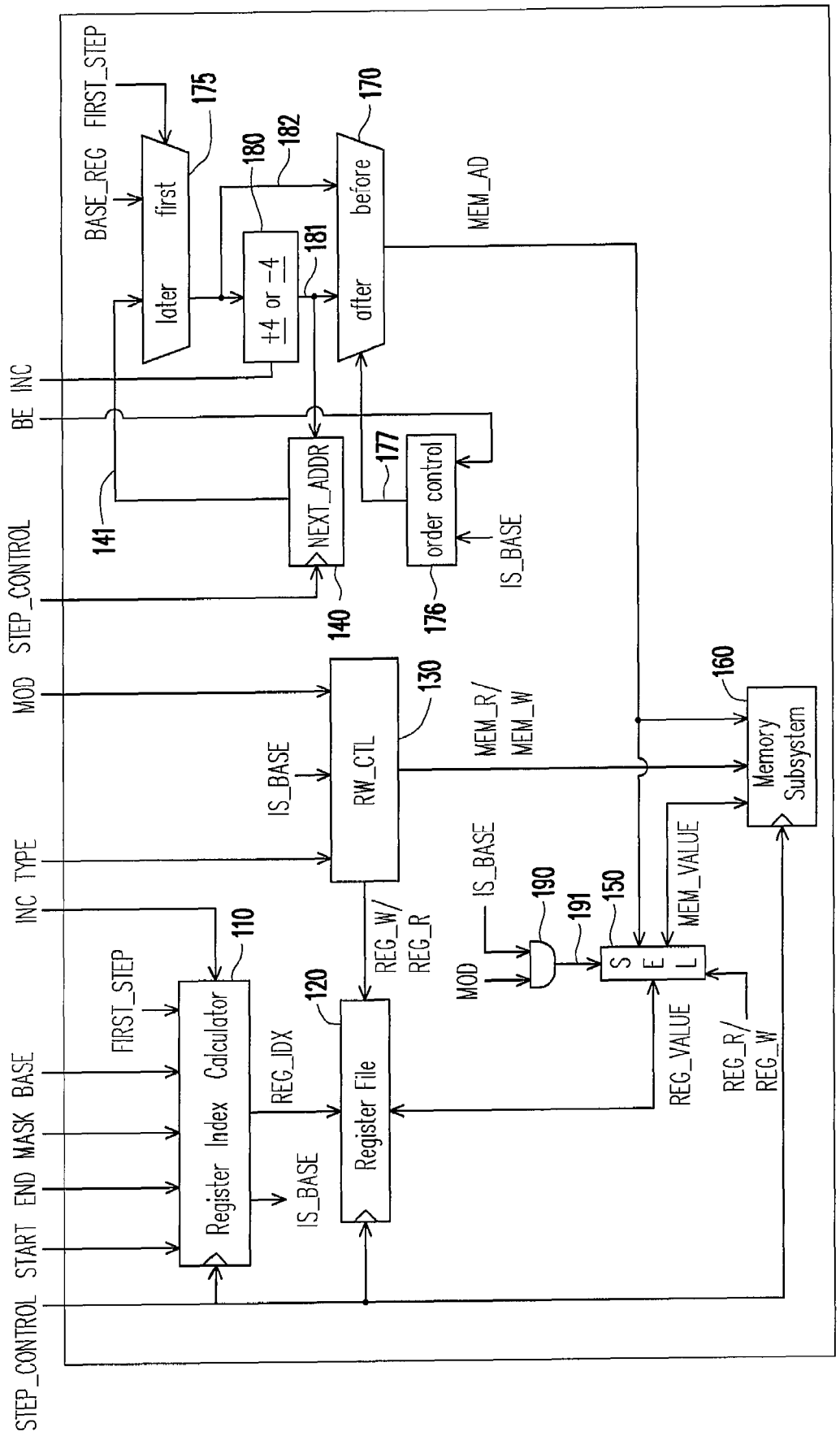
FIG. 1 shows a circuit implementation for multi-word transfers between a processor register file and a memory subsystem according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

An embodiment of the invention provides multi-word transfer instructions for moving multiple words between consecutive memory locations and multiple processor registers.

In addition, a circuit implementation for transferring multiple words between a memory subsystem and the processor registers is also provided.

In the embodiment, two values of an access type specifier TYPE of the multi-word transfer instruction are disclosed. When TYPE is load, it specifies load multiple words (lmw) instruction which is used to transfer multiple words from a memory subsystem into a processor register file. When TYPE is store, it specifies store multiple words (smw) instruction, which is used to transfer multiple words from a processor register file into a memory subsystem.

In addition, the multi-word transfer instruction at least specifies the following information: a start register index START and an end register index END of a consecutive register group in a processor register file, a mask specifier MASK to select special registers in the same processor register file and a base register specifier BASE for the starting address of the corresponding memory locations. The group of registers specified by START~END and MASK is referred to as the transfer register list. They are used one step at a time as the source (for TYPE store) or as the destination (for TYPE load). The registers in the transfer register list are ordered by register index values with the lowest register index in the beginning of the list and the highest register index in the end of the list.

Further, the multi-word transfer instructions may specify additional information, such as an address update mode, an order mode and a modification mode. The address update mode INC indicates whether to increment or decrement the base address by 4 for each memory word transfer. Accordingly, the registers in the transfer register list are used from beginning of the list one at a time if the update mode is "increment", and the registers in the transfer register list are used from the end of the list one at a time if the update mode is "decrement". The order mode BE indicates whether to access memory before or after the address update. The modification mode MOD indicates whether to modify the base register in the end of the instruction execution as the last-updated address.

So, there are two phases of operations in the multi-word transfer instruction. The first phase, referred to as memory transfer phase, is for moving data between the addressed memory locations and the register transfer list. The second phase, referred to as base modification phase, is for writing the base register in the end of the instruction execution if the modification mode MOD is specified.

For example, the common 32-bit instruction processors may have a general-purpose register (GPR) file with 32 registers, which may be numbered from r0~r31. Assume the last four GPRs (r28~r31) are specified as special registers dp, fp, rp and sp, respectively.

The register specifiers START, END and BASE occupy 5 bits each to specify one register among 32 registers, and 15 bits as a total. The specifier MASK occupies 4 bits to designate the 4 special registers (dp, fp, rp and sp). The additional information, i.e. the address update mode, the order mode and the modification mode occupy 1 bit each or 3 bits as a total.

So, in such a multi-word transfer instruction of the processors with 32 registers, bits available for operation code (opcode) and more selection mask are 32−15−4−3=10.

The memory load and store instructions may have a format like:

lmw.mode START, END, MASK, [BASE]
smw.mode START,END,MASK, [BASE]

Wherein "lmw" stands for "load multiple words"; "smw" stands for "store multiple words"; and "mode" specifies the above additional information BE/INC/MOD.

For example, a memory load instruction may have a format like:

lmw.bim r1, r3, #0b0110, [r31]

Wherein register r1 is specified as the starting register, r3 as the end register, r29 and r30 as mask-selected registers and r31 as base register, and further "bim" specifies to access the memory before incrementing base address by 4 and modify the base register in the end of the instruction execution.

The corresponding operations for "lmw.bim r1, r3, #0b0110, [r31]" are as follows:

```
addr= register[r31];       /* addr is the initial address */
register[r1] <= memory [addr];    addr= addr+4;
register[r2] <= memory [addr];    addr= addr+4;
register[r3] <= memory [addr];    addr= addr+4;
register[r29] <= memory [addr];   addr= addr+4;
register[r30] <= memory [addr];   addr= addr+4;
register[r31] <= addr;     /* addr equals to register[31]+4*5 */
```

In the above operation, "addr=register[r31]" means to initialize the temporary value addr to the value of register[r31]; "register[rx]<=memory [addr]" means to load the content of the memory location, with address specified by the temporary value addr, into the register rx, where rx=r1, r2, r3, r29 and r30; "addr=addr+4" means to increment the address, and in this case, each memory access is done before a corresponding address update; "register[r31]<=addr" means to modify the base register r31 in the end of the instruction execution to the last-updated address.

For another example, a memory store instruction may have a format like:

smw.adm r2, r4, #0b1001, [r31]

Wherein register r2 is specified as the starting register, r4 as the end register, r31 and r28 as mask-selected registers and r31 as base register, and further "adm" specifies to access the memory after decrementing base address by 4 and modify the base register in the end of the instruction execution.

The corresponding operations for "smw.adm r2, r4, #0b1001, [r31]" are as follows:

```
addr= register[r31];       /* addr is the initial address */
addr= addr−4;   memory [addr] <= register[r31];
addr= addr−4;   memory [addr] <= register[r28];
addr= addr−4;   memory [addr] <= register[r4];
addr= addr−4;   memory [addr] <= register[r3];
```

-continued

```
addr= addr-4;    memory [addr] <= register[r2];
register[r31] <= addr;    /* addr equals to register[31]-4*5 */
```

In the above operations, "addr=register[r31]" means to initialize the temporary value addr to the value of register [r31]; "memory [addr]<=register[rx]" means to load the content of the memory location, with address specified by the temporary value addr, into the register rx, where rx=r31, r28, r4, r3, and r2; "addr=addr-4" means to decrement the address, and in this case, each memory access is done after a corresponding address update; "register[r31]<=addr" means to modify the base register r31 in the end of the instruction execution to the last-updated address.

In common usage, the register r31 can be used as a stack pointer (sp) and the above example may be used for function stack restoring.

The semantics of the multi-word transfer instruction is defined as follows, where inc_or_dec is "+" (plus) if the address update mode INC is "increment"; is "−" (minus) if the address update mode INC is "decrement".

```
{
    addr=register[base];
    for each register index reg_idx in the order
            specified by [START, END, MASK, INC] {
        if(order mode is "after") addr=addr inc_or_dec 4;
        if (access mode is "load")
            register[reg_idx]=memory[addr];
        else /* store */
            memory[addr]=register[reg_idx];
        if(order mode is "before") addr=addr inc_or_dec 4;
    }
    if(modification mode is "yes")
        register[base]= addr;
}
```

In this embodiment, the total number of words accessed by one instruction is equal to the number of registers specified by the register specifiers START, END and MASK. For example, the total number of words accessed by the above multi-word transfer instruction (i.e. lmw.bim r1, r3, #0b0110, [r31]) is 5 because the register specifiers START and END specifies 3 registers (r1~r3) there between and the register specifier MASK specifies 2 register (r29 and r30).

Registers are usually partitioned according to common programming convention for function calls as: function arguments and return values, function caller-save registers, function callee-save register, temporary registers and special registers (such as sp, fp, dp, rp, etc.). Usually, other than the special registers, these registers are indexed by consecutive numbers. In this embodiment, it is capable of saving/restoring any group of registers along with the special registers.

In this embodiment, copying the contents of multiple words from a memory address to another memory address may be achieved by executing a load multiple words instruction lmw followed by a store multiple words instruction smw.

FIG. 1 shows a circuit implementation for the multi-word transfer instruction between a memory subsystem 160 and a processor register file 120 according to the embodiment of the present invention.

The circuit includes a register index calculator 110, a read/write controller 130, a next memory address register NEXT_ADDR register 140, a bidirectional selection unit 150, a multiplexer 170, a multiplexer 175, an order control 176, an arithmetic operation unit 180 and a logic operation unit 190.

The register index calculator 110, the next memory address register NEXT_ADDR register 140, the memory subsystem 160 and the processor register file 120 operate under the control of an external clock signal, referred to as STEP_CONTROL. As known by skilled persons in the art STEP_CONTROL can be a simple circuit clock signal, which is valid only during the period of operations of the multi-word transfer instruction.

At the beginning of executing a multi-word transfer instruction, a signal FIRST_STEP is asserted for one STEP_CONTROL cycle to control the register index calculator 110 and multiplexer 175.

When FIRST_STEP is asserted, the multiplexer 175 selects the initial value of a sequence of the memory addresses from BASE_REG, which is the value read from the register file 120 using register index BASE through a different register read port assumed in this embodiment. The detailed operations of getting the value BASE_REG are well-known by persons skilled in the art and are thus omitted for brevity. When FIRST_STEP is not asserted, multiplexer 175 selects its input from NEXT_ADDR register 140.

Upon receiving an asserted FIRST_STEP, the register index calculator 110 starts generating a register index REG_IDX based on the specifiers START, END, MASK and BASE, one STEP_CONTROL cycle at a time. Further, the register index calculator 110 may generate the register index REG_IDX based on the address update mode INC, wherein the address update mode is optional in the operation of the register index calculator 110. When the address update mode INC indicates an increment, the register index calculator 110 may designate the registers by outputting the corresponding register index REG_IDX sequentially one STEP_CONTROL cycle at a time from the beginning of the transfer register list specified by the specifiers START~END (from START to END), and MASK. When the address update mode indicates a decrement, then the register index calculator 110 may designate the registers by outputting the corresponding register index REG_IDX sequentially one STEP_CONTROL cycle at a time from the end of the transfer register list specified by the specifiers MASK, and END~START (from END to START). If the modification mode is asserted, the register index calculator 110 will output the index for BASE in the end of the instruction execution. For example, for the load multiple words instruction with the format of "lmw.bim r1, r3, #0b0110, [r31]", the register index REG_IDX sequentially designates r1, r2, r3 (based on START~END), r29, r30 (based on MASK) and r31 (BASE). Similarly, for the store multiple words instruction with the format of "smw.bdm r1, r3, #0b1001, [r31]", the register index REG_IDX sequentially designates r31, r28 (based on MASK), r3, r2, r1 (based on END~START) and r31 (BASE).

Further the register index calculator 110 asserts an indication signal IS_BASE, after the register index calculator 110 has generated all indexes of registers in the transfer register list of a multi-word transfer instruction and is generating the index for register BASE. When IS_BASE is not asserted, the circuit is in the memory transfer phase; and when IS_BASE is asserted and MOD is true, the circuit is in the base modification phase.

The register file 120 receives the register index REG_IDX from the register index calculator 110 for specifying which register is to be read or written.

The read/write controller RW_CTL 130 controls read/write operations of the memory subsystem 160 and the register file 120 in response to the memory access type signal TYPE, the indication signal IS_BASE and the modification mode MOD. Control signals MEM_R, MEM_W, REG_R and REG_W are used to enable memory read operation, memory write operation, register read operation and register write operation, respectively. The detail operations of the read/write controller 130 are explained in the following.

The bidirectional selection unit SEL 150 determines if the direction of data stream is from REG_VALUE to the MEM_VALUE (in case of memory write during memory transfer phase, i.e. when REG_R is true and 191 is false), from MEM_VALUE to REG_VALUE (in case of memory read during memory transfer phase, i.e. when REG_W is true and 191 is false), or from MEM_AD to REG_VALUE (during the base modification phase, i.e. when both REG_W and 191 are true).

The NEXT_ADDR register 140 is the register used to temporarily store the updated memory address as an output 181 after increment or decrement, and as an input to the multiplexer 175 for use in the next STEP_CONTROL cycle.

Through the control of an output signal 177 from the order control 176, the multiplexer 170 selects one of the updated base addresses 181 and 182 in response to the order mode BE and IS_BASE. If the order mode indicates a before mode (which means to do memory access before incrementing or decrementing the memory address), the multiplexer 170 selects the input 182; otherwise, the multiplexer 170 selects the input 181. However, if the modification mode is true, the multiplexer 170 always selects the input 181 in the last cycle of STEP_CONTROL cycle.

The generation of the signal 177 is defined as:

```
if(IS_BASE)
    signal 177= before;
else
    signal 177= BE;        /* BE can be before or after */
```

The arithmetic operation unit 180 receives the base register specified by BASE or the output 141 of the NEXT_ADDR register 140 and generates the updated base address 181 in response to the address update mode INC, for example, increment by 4 or decrement by 4.

Now, please refer to FIG. 1 again for explaining the data transfer between the register file 120 and the memory subsystem 160. The load multiple words instruction with the format of "lmw.bim r1, r3, #0b0110, [r31]" is exemplary here. As explained above, the register index REG_IDX from the register index calculator 110 sequentially indicates r1, r2, r3, r29, r30 and r31, one STEP_CONTROL cycle at a time.

At the first STEP_CONTROL cycle of the instruction, the signal FIRST_STEP is asserted. The register index REG_IDX indicating r1 is sent to the register file 120. The read/write controller 130 generates the memory read signal MEM_R to the memory subsystem 160 and the register write signal REG_W to the register file 120. Then, the memory subsystem 160 sends out the memory content MEM_VALUE, which is specified by the memory address MEM_AD with the value of r31 under the control of the multiplexer 175 which selects its input BASE_REG from port "first", the multiplexer 170 which selects its input 182 from port "before", and the bidirectional selection unit 150 passes the memory content MEM_VALUE as the register value REG_VALUE into the register r1 in the register file 120. At the same time, the value of the base register increments by 4 and its value, r31+4, is stored in the NEXT_ADDR register 140.

At the next STEP_CONTROL cycle, the register index REG_IDX indicating r2 is sent to the register file 120. The read/write controller 130 continues to generate the memory read signal MEM_R to the memory subsystem 160 and the register write signal REG_W to the register file 120. Then, the content of the memory subsystem 160, which is specified by the memory address MEM_AD, is written into the register r2 in the register file 120. The memory address MEM_AD, under the control of the multiplexer 175 which selects its input 141 from port "later", and the multiplexer 170 which selects its input 182 from port "before", indicates the value from the NEXT_ADDR register 140, which is equal to r31+4. At the same time, the arithmetic operation unit 180 increments its input, also coming from the NEXT_ADDR register 140 with the value of r31+8, by another 4, and its output, equal to r31+8 now, is again stored in the NEXT_ADDR register 140.

Then, the memory contents specified by the memory addresses MEM_AD with the values equal to (r31+8), (r31+12) and (r31+16) are loaded into the registers r3, r29 and r30 by the above operations. In the end of the instruction execution, since the base register specifier BASE is to be modified, the register index calculator 110 outputs the register index REG_IDX as BASE and asserts signal IS_BASE, while the multiplexer 170 selects its input 181 from port "after" for the memory address MEM_AD with the value of r31+20, and the bidirectional selection unit 150 in turn selects the memory address MEM_AD as the register value REG_VALUE for updating the base register specified by BASE (i.e. r31=r31+20).

In the above example, by the above multi-word transfer instruction, 5 words from consecutive memory locations are loaded into the processor registers by a single instruction.

The following shows detail operations of the read/write controller 130 in FIG. 1 during the period of the multi-word transfer instruction.

```
If(IS_BASE is false) {    /*memory transfer phase*/
    If(TYPE == "load") {
        assert REG_W;
        assert MEM_R;
    } else {                /*TYPE=="store"*/
        assert REG_R;
        assert MEM_W;
    }
} else if(both IS_BASE and MOD are true) { /*base modification phase*/
    assert REG_W;
}
```

When signal IS_BASE is false (i.e. the memory transfer phase), the read/write controller 130 asserts the memory read signal MEM_R and the register write signal REG_W if the memory access type signal TYPE is load; the read/write controller 130 asserts the register read signal REG_R and the memory write signal MEM_W if the memory access type signal TYPE is store. When both signals IS_BASE and MOD are true (i.e. the base modification phase), the read/write controller 130 asserts only the register write signal REG_W.

In another embodiment, the processor transfer register list may be specified by START, NUMREG and MASK, where START and MASK are defined the same as in the previous embodiment, and NUMREG indicates the number of registers in the consecutive register group. As a result, "lmw START, NUMREG, MASK, [BASE]" in this embodiment is equivalent to "lmw START, END, MASK, [BASE]" in the previous embodiment, where END=START+NUMREG−1.

By the above examples and embodiments, one multi-word transfer instruction is enough in moving multiple words between consecutive memory locations and multiple processor registers and there are still several available bits for opcodes and more selection mask specifiers.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. A memory transfer method between a memory subsystem and a processor register file, the method comprising: generating a multi-word transfer instruction, wherein the multi-word transfer instruction specifies an access type information, a consecutive register group information based on a pair of information, a mask selection information and a base register information for a starting address of corresponding memory locations in the memory subsystem, wherein the mask selection information indicates at least one of a plurality of special registers to be selected, and the special registers comprises a general data pointer, a frame pointer, a function call return pointer, and a stack pointer; and moving multiple words between the memory subsystem and the processor register file in response to the multi-word transfer instruction, wherein the access type information specifies one of a memory load type and a memory store type, wherein the total number of words transferred is equal to the number of registers specified in the consecutive register group, plus the number of registers specified by the mask selection information, wherein the multi-word transfer instruction further specifies an address update mode, for indicating to update the memory address for each memory transfer, based on the starting address of the corresponding memory locations, wherein the multi-word transfer instruction further specifies an order mode for indicating whether the memory access is performed before or after each update of the memory address, and wherein the multi-word transfer instruction further specifies a modification mode for indicating whether to modify the base register information in the end of the instruction execution according to the last-updated memory address.

2. A circuit for moving multiple words between a memory subsystem and a processor register file in response to a multi-word transfer instruction which specifies an access type information, a consecutive register group based on a pair of information, a mask selection information and a base register information for a starting address of corresponding memory locations in the memory subsystem, wherein the mask selection information indicates at least one of a plurality of special registers to be selected, and the special registers comprises a general data pointer, a frame pointer, a function call return pointer, and a stack pointer, and the circuit comprising: a register index calculator, generating a register index and a base modification indication signal based on the consecutive register group information, the mask selection information and the base register information; an read/write controller, for generating a memory access control signal to the memory and a register access control signal to the processor register file, in response to the access type information and the base modification indication signal; and a bidirectional selection unit, bi-directionally forwarding the multiple words between the memory subsystem and the processor register file, based on the memory access control signal and the register access control signal, wherein the multi-word transfer instruction further specifies: an address update mode for indicating to update the memory address consecutively; an order mode for indicating whether the memory access is performed before or after each update of the memory address; and a modification mode for indicating whether to modify the base register in the end of the instruction execution as last-updated memory address, further comprising: an arithmetic operation unit, for updating the memory address in response to the address update mode, a next address register, for temporarily storing the updated memory address from the arithmetic operation unit, a first multiplexer, for selecting between an initial memory address of the memory locations and an output of the next address register, and a second multiplexer, for selecting between an output of the arithmetic operation unit and an output of the first multiplexer.

* * * * *